US007499888B1

(12) United States Patent
Tu et al.

(10) Patent No.: US 7,499,888 B1
(45) Date of Patent: Mar. 3, 2009

(54) TRANSACTION AUTHENTICATION SYSTEM AND METHOD

(75) Inventors: Edgar Allan Tu, Castro Valley, CA (US); Eric Pang, Sunnyvale, CA (US)

(73) Assignee: FusionOne, Inc., San Jose, CA (US)

( * ) Notice: Subject to any disclaimer, the term of this patent is extended or adjusted under 35 U.S.C. 154(b) by 881 days.

(21) Appl. No.: 09/811,353

(22) Filed: Mar. 16, 2001

(51) Int. Cl.
*G06Q 40/00* (2006.01)
(52) U.S. Cl. ...................................................... 705/44
(58) Field of Classification Search ................... 705/44, 705/39–42
See application file for complete search history.

(56) References Cited

U.S. PATENT DOCUMENTS

| | | | | |
|---|---|---|---|---|
| 5,826,245 | A | * | 10/1998 | Sandberg-Diment ......... 705/44 |
| 5,933,653 | A | | 8/1999 | Ofek ........................... 395/826 |
| 5,974,238 | A | | 10/1999 | Chase, Jr. ............... 395/200.78 |
| 6,014,695 | A | | 1/2000 | Yamashita et al. .......... 709/219 |
| 6,026,414 | A | | 2/2000 | Anglin ........................ 707/204 |
| 6,038,665 | A | | 3/2000 | Bolt et al. .................... 713/176 |
| 6,049,776 | A | | 4/2000 | Donnelly et al. ................ 705/8 |
| 6,064,880 | A | | 5/2000 | Alanara ....................... 455/419 |
| 6,173,311 | B1 | | 1/2001 | Hassett et al. ............... 709/202 |
| 6,185,598 | B1 | | 2/2001 | Farber et al. ................ 709/200 |
| 6,195,695 | B1 | | 2/2001 | Cheston et al. ............. 709/221 |
| 6,256,750 | B1 | | 7/2001 | Takeda ......................... 714/11 |
| 6,260,124 | B1 | | 7/2001 | Crockett et al. ............. 711/162 |
| 6,292,905 | B1 | | 9/2001 | Wallach et al. ................. 714/4 |
| 6,317,755 | B1 | | 11/2001 | Rakers et al. ............... 707/204 |
| 6,324,526 | B1 | * | 11/2001 | D'Agostino ................. 705/44 |
| 6,360,330 | B1 | | 3/2002 | Mutalik et al. ................. 714/4 |
| 6,363,249 | B1 | | 3/2002 | Nordeman et al. .......... 455/418 |
| 6,381,700 | B1 | | 4/2002 | Yoshida ...................... 713/201 |
| 6,389,462 | B1 | | 5/2002 | Cohen et al. ................ 709/218 |
| 6,453,392 | B1 | | 9/2002 | Flynn, Jr. .................... 711/151 |
| 6,539,494 | B1 | | 3/2003 | Abramson et al. .............. 714/4 |
| 6,553,413 | B1 | | 4/2003 | Leighton et al. ............ 709/219 |

(Continued)

OTHER PUBLICATIONS

Anne Finnigan, The safe way to shop online, Good Housekeeping. Sep. 1998, pp. 1-2.*

(Continued)

*Primary Examiner*—Hani Kazimi
(74) *Attorney, Agent, or Firm*—Haverstock & Owens LLP

(57) ABSTRACT

A transaction security and authentication apparatus and system for electronic commerce which provides authentication of internet purchases by communication with a cardholder's base computer, or by contacting the cardholder by remote access for purchase verification. The system preferably comprises at least one central server system associated with a remote access system and configured for communication with a payment institution, and at least one internet capable device, operatively coupled for communication with the central server system, with the central server system configured to determine authentication of a cardholder electronic transaction, according to data received from the internet capable device upon a request for verification of the cardholder electronic transaction from the payment institution. The method of the invention generally comprises requesting verification of a cardholder electronic transaction, by a payment institution, from a central server system, contacting, by the central server system, at least one internet capable device associated with the cardholder, determining, by the central server system, if the cardholder electronic transaction is authorized by the cardholder, and communicating authentication information, by the central server system, to the payment institution.

20 Claims, 4 Drawing Sheets

U.S. PATENT DOCUMENTS

| | | |
|---|---|---|
| 6,591,362 B1 | 7/2003 | Li .................................. 713/1 |
| 6,640,302 B1 | 10/2003 | Subramaniam et al. ..... 713/169 |
| 6,704,849 B2 | 3/2004 | Steegmans ................. 711/162 |
| 6,718,390 B1 | 4/2004 | Still et al. ................... 709/229 |
| 6,732,101 B1 | 5/2004 | Cook .......................... 707/10 |
| 6,732,264 B1 | 5/2004 | Sun et al. ....................... 713/2 |
| 6,738,789 B2 | 5/2004 | Multer et al. ............... 707/201 |
| 6,757,696 B2 | 6/2004 | Multer et al. ............... 707/201 |
| 6,799,214 B1 | 9/2004 | Li .............................. 709/226 |
| 6,804,690 B1 | 10/2004 | Dysert et al. ................ 707/204 |
| 6,816,481 B1* | 11/2004 | Adams et al. ............... 370/352 |
| 6,836,765 B1* | 12/2004 | Sussman ...................... 705/75 |
| 6,839,568 B2 | 1/2005 | Suzuki .................... 455/550.1 |
| 6,850,944 B1 | 2/2005 | MacCall et al. ............ 707/100 |
| 6,944,651 B2 | 9/2005 | Onyon et al. ................ 709/217 |
| 6,954,783 B1 | 10/2005 | Bodwell et al. ............. 709/218 |
| 6,963,914 B1 | 11/2005 | Breitbart et al. ............. 709/226 |
| 7,003,555 B1 | 2/2006 | Jungck ....................... 709/219 |
| 7,007,041 B2 | 2/2006 | Multer et al. ............... 707/201 |
| 7,051,275 B2 | 5/2006 | Gupta et al. ................ 715/512 |
| 7,054,594 B2 | 5/2006 | Bloch et al. ............... 455/41.2 |
| 7,233,791 B2 | 6/2007 | Gilbert et al. ............... 455/419 |
| 7,269,433 B2 | 9/2007 | Vargas et al. ................ 455/502 |
| 7,289,964 B1 | 10/2007 | Bowman-Amuah ............ 705/1 |
| 7,315,826 B1 | 1/2008 | Guheen et al. ................. 705/7 |
| 2001/0051920 A1* | 12/2001 | Joao et al. ...................... 705/41 |
| 2002/0010868 A1 | 1/2002 | Nakashima et al. ......... 713/201 |
| 2002/0032751 A1 | 3/2002 | Bharadwaj .................. 709/218 |
| 2002/0049852 A1 | 4/2002 | Lee et al. .................... 709/231 |
| 2002/0055909 A1* | 5/2002 | Fung et al. ..................... 705/42 |
| 2002/0073212 A1* | 6/2002 | Sokol et al. ................. 709/229 |
| 2002/0082995 A1* | 6/2002 | Christie, IV ................. 705/44 |
| 2003/0028451 A1 | 2/2003 | Ananian ....................... 705/27 |
| 2003/0061163 A1* | 3/2003 | Durfield ....................... 705/44 |
| 2003/0135463 A1* | 7/2003 | Brown et al. ................. 705/44 |
| 2003/0229898 A1 | 12/2003 | Babu et al. .................... 725/87 |
| 2004/0093385 A1 | 5/2004 | Yamagata ................... 709/206 |
| 2004/0111465 A1 | 6/2004 | Chuang et al. .............. 709/203 |
| 2005/0086296 A1 | 4/2005 | Chi et al. .................... 709/203 |
| 2008/0022220 A1 | 1/2008 | Cheah ........................ 715/769 |

OTHER PUBLICATIONS

Larry Chase, Taking transactions online, Target Marketing, Oct. 1998, 1-4.*

Gong; "Increasing Availability and Security of an Authentication Service"; IEEE Journal on Selected Areas in Communications; v11 n5; pp. 657-662; Jun. 1993.*

DeMaio; "My MIPs are Sealed"; Chief Information Officer Journal; v5 n7; pp. 46-50; Sep./Oct. 1993; Dialog: File 15.*

* cited by examiner

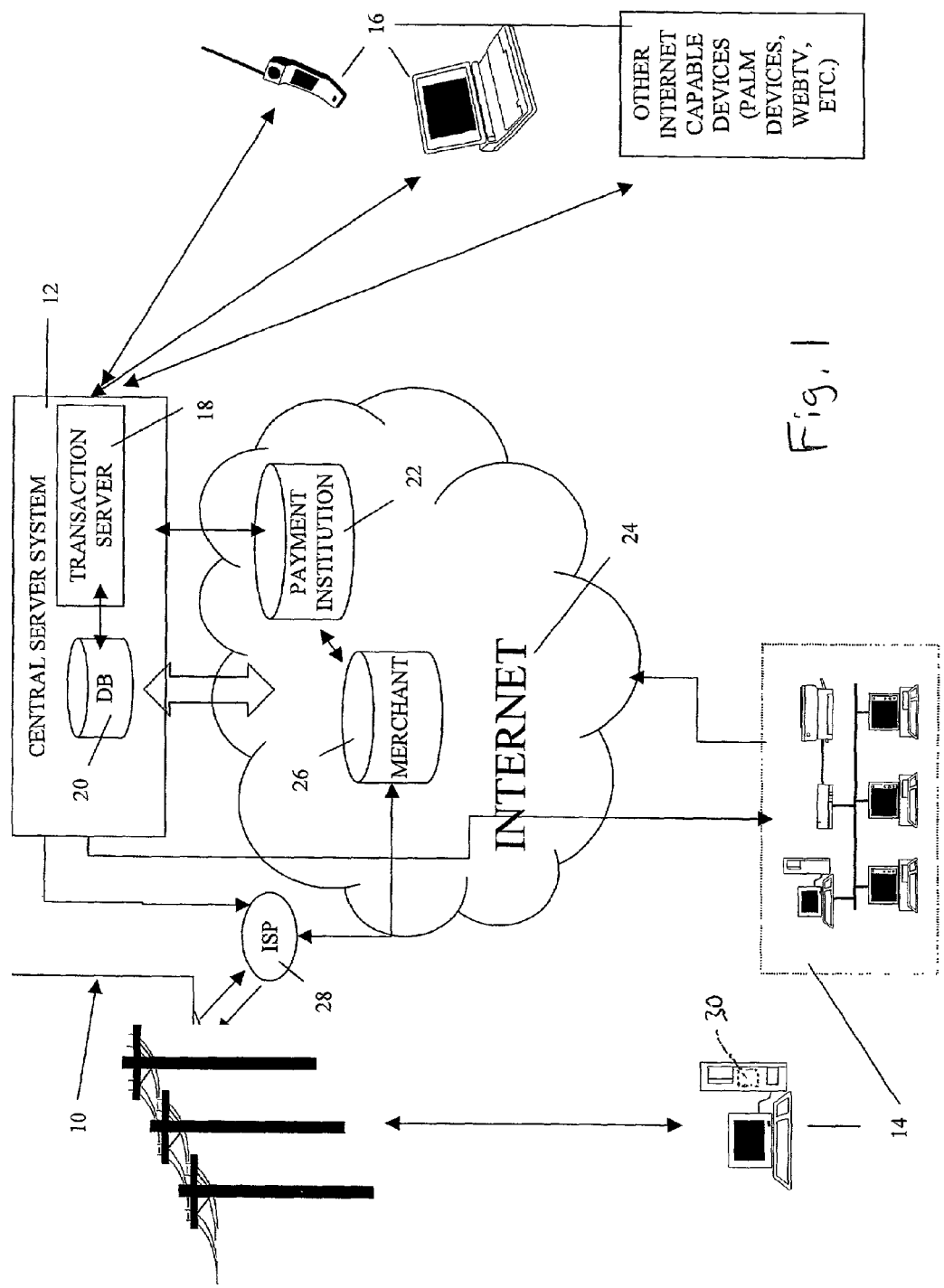

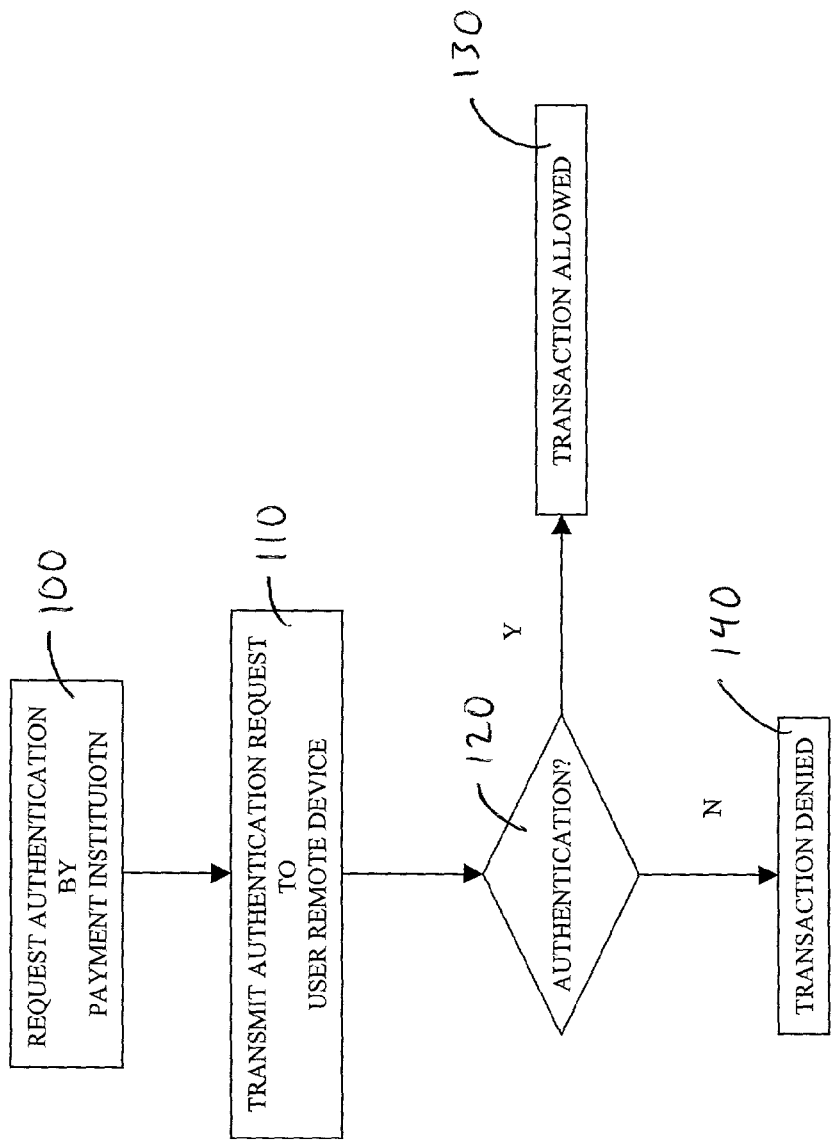

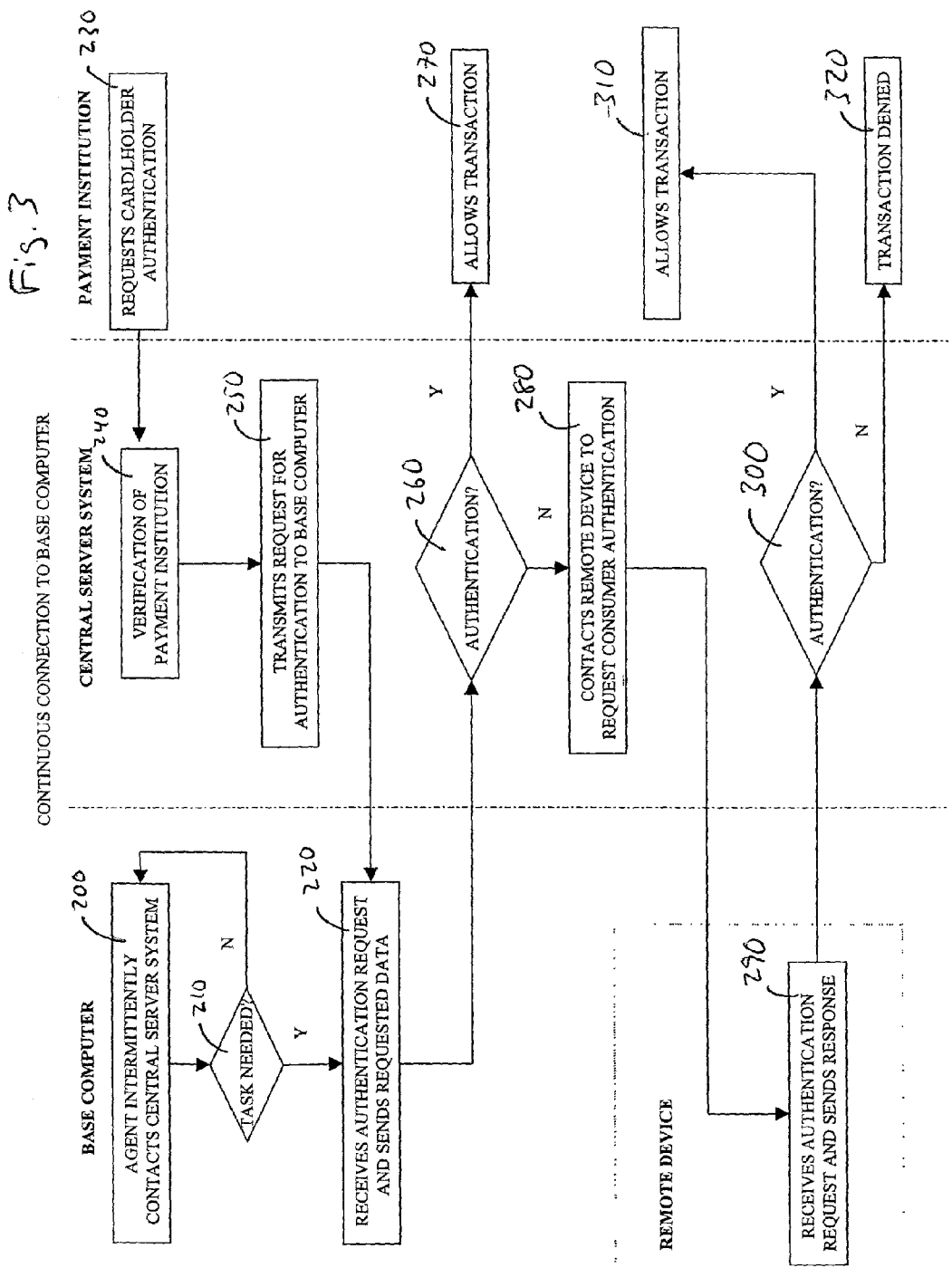

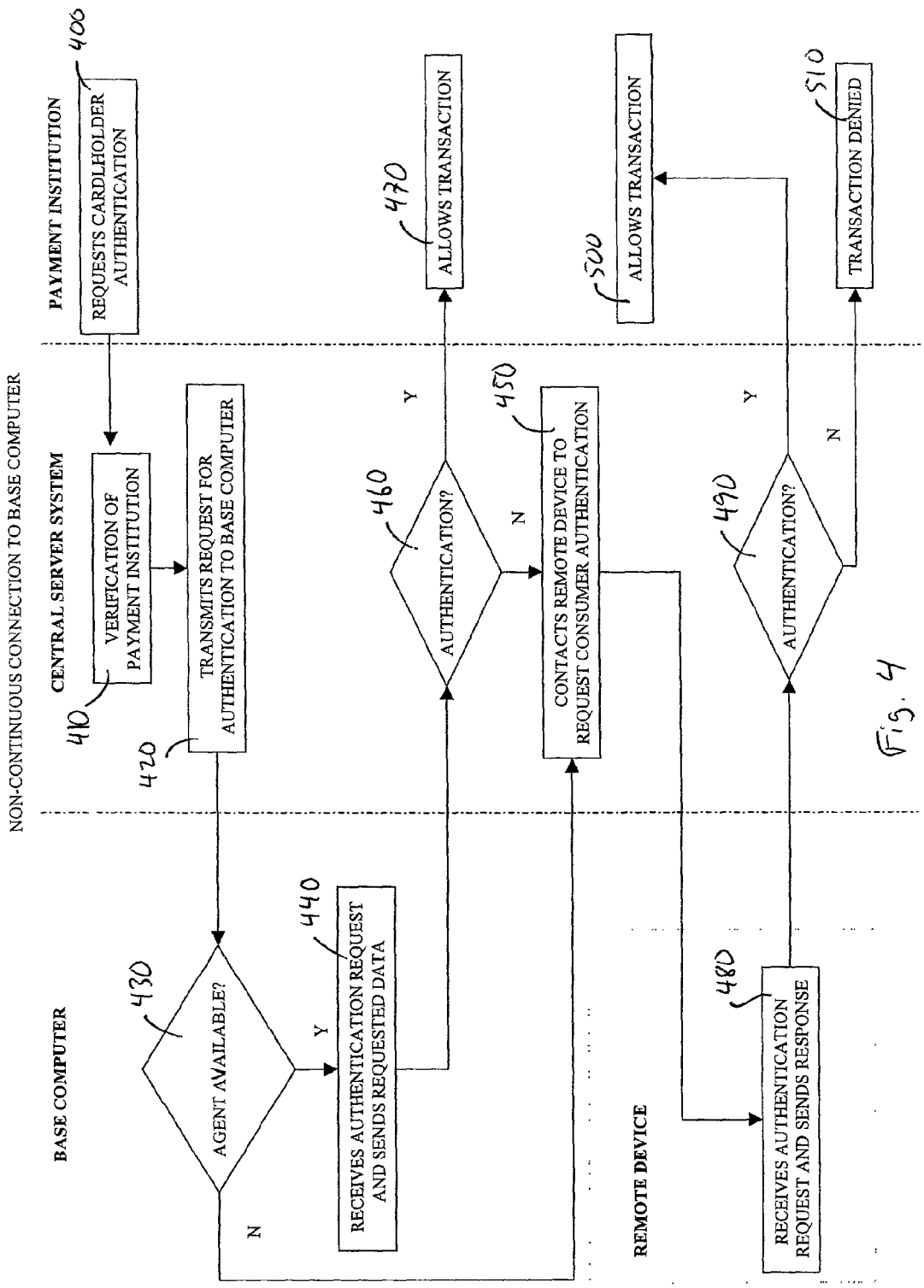

TRANSACTION AUTHENTICATION SYSTEM AND METHOD

BACKGROUND OF THE INVENTION

1. Field of the Invention

This invention pertains generally to security and authentication systems and methods for internet commerce. More particularly, the invention is a transaction authentication system and method which provides multiple levels of security, which provides for authentication of a purchaser transparently, and further provides verification of the purchaser by remote access.

2. The Prior Art

Internet fraud is the subject of considerable concern to merchants, banks and consumers. Unfortunately, most online merchants only verify that the payment or credit card number of a purchaser has not been reported as stolen or called in lost by the cardholder. No further authentication of the purchaser is completed. The internet commerce industry is very interested in improving the measures utilized to ensure the authenticity of each transaction. Recently, many security and verification systems such as digital credential, digital signatures, electronic checks and digital certificates have been implemented to reduce fraudulent use of credit cards.

At present, there are two major types of reliable security technologies deployed on the internet; SSL (Secure Sockets Layer), and SET™ (Secure Electronic Transaction). These are currently available for online purchases. Secure Sockets Layer (SSL) provides sound privacy protection by encrypting the channel between the consumer and the merchant. Since the data sent over the channel is secure, SSL is sufficient security for the consumer when doing business with merchants they know, but SSL does not authenticate that the purchaser is the rightful owner of the offered credit card number.

Secure Electronic Transaction (SET) makes online transactions secure by encrypting payment information in a manner similar to SSL, and in addition also uses digital certificates to verify that both consumers and merchants are authorized to use and accept credit card numbers. Merchants worldwide are currently adopting SET. The SET authentication process uses electronic forms of identification known as digital certificates that are issued to cardholders and merchants by electronic payment institutions. Transactions require a significant amount of computation by multiple parties for completion.

Most security and authentication systems presently in use require digital certification, such as a personal identification number (PIN) or prior verification, to obtain e-checks, e-cash, e-charge or digital certificates. It may also be necessary for the purchaser and merchant to obtain specific software to allow the use of these security systems. At present, these systems are cumbersome, awkward, and time consuming for both the consumer and the merchant and do not fully address the fraudulent use of payment card numbers which is so prevalent in electronic commerce.

The most secure way to authenticate the identity of a consumer is by personal intervention. Personal intervention is straight forward for person-to-person sales in which the signature of the consumer or a picture ID can be produced for consumer verification at the time of sale. Unfortunately, personal intervention for electronic purchases is not as simplistic, and authentication of the purchaser may entail answering laborious personal questions or entering PIN numbers or other digital certification. Most consumers have trouble remembering usernames, passwords and PIN numbers unique for individual merchants, and many consumers avoid shopping through merchants using such payment security measures.

Accordingly, there is a need for a method and apparatus for consumer authentication which can be achieved securely and transparently at the time of purchase. There is also a need to verify and authenticate purchasers by remote access. The present invention satisfies these needs, as well as others, and generally overcomes the deficiencies found in the background art.

BRIEF DESCRIPTION OF THE INVENTION

The present invention is a transaction security and authentication apparatus and system for electronic commerce which provides authentication of internet purchases by communication with a cardholder's base computer, or by contacting the cardholder remotely for purchase verification. The invention farther relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

Most of the online purchasing by a consumer or "cardholder" occurs from the cardholder's home or base computer. Businesses which purchase goods and services through electronic transactions will also generally use a base computer or device associated with the business to make electronic transactions. Fraudulent internet purchases typically will not occur at the cardholder's base or home computer. The present invention advantageously utilizes verification of internet purchases from a cardholder's base computer to allow transparent purchases by the cardholder. In instances where a cardholder makes an internet purchase via a remote machine, other than the base computer, the invention provides for remote authorization.

Co-pending application entitled REMOTE ACCESS COMMUNICATION ARCHITECTURE APPARATUS AND METHOD, filed Jul. 19, 2000, U.S. patent application Ser. No. 09/618,958 by inventors Tu et al., which is expressly incorporated herein by reference, describes a system architecture and method suitable for use with the present invention. This remote access system can be used to authenticate electronic transactions of users of the remote access system, and the invention will be more fully understood by first considering the aspects of the remote access system. It should be readily understood that the above remote access system is merely one such system usable with the invention, and other remote access systems may also be used with the invention.

Generally, credit card purchasers or "cardholder" users of a remote access system may access the cardholder's base computer from a remote device such as a laptop computer, cellular telephone, "palm pilot", or any other device capable of accessing the internet. A browser interface on a laptop computer, for example, is all that would be required for a laptop computer to achieve access. The laptop user would then access the central server system web site and be provided with one or more tasks or options that the user may desire to perform. Such tasks may include, for example, checking email on the base computer, obtaining files from the base computer, copying files from the remote computer to the base computer, or accessing an address book on the base computer.

In the preferred remote access system, the cardholder's base computer intermittently contacts or queries the central server system, via an agent, to determine whether the central server system has established a session with a remote device of the cardholder. When a session has been established between a remote cardholder device and the central server system, the central server system replies to the base computer's next intermittent request with an IP (internet protocol) address and port number for the base computer to establish a socket connection. The IP address and port number correspond to a server in the central server system which is handling the particular session task requests. That socket connection will be maintained between the base computer and the server until the server ends the session (or a predefined timeout period expires). While the socket connection is maintained, the base computer "listens" for tasks from the server.

It should be noted that because of the intermittent initial contacts from the base computer to the central server system, operation of the remote access system will be allowed even in the presence of a firewall (i.e. a firewall between the base computer and the internet is intended to preclude a signal from an outside source coming through the firewall unless requested, but will allow outgoing signals; thus, a message sent from a base computer to a web server would be allowed through a firewall along with any response to the message). Likewise, since the base computer establishes the continuous connection with the IP socket and port number of the server in question after being informed of same from the central server system in response to one of the intermittent contacts, a firewall is not a problem.

Thus, once a task is selected, the central server system, via the connected server (to the base computer), transmits the task request to the base computer, and the base computer provides the data and/or files necessary to fulfill that request in response back to the central server system. The central server system then, in turn, presents the requested data to the remote device in an internet readable form. Additionally, the communications between the remote device and the central server system are preferably conducted via a secure sockets layer (SSL) for security purposes, and the communications between the base computer and the central server system are preferably conducted via a proprietary protocol utilizing encryption as well to also ensure security.

The periodic queries made by the cardholder's base computer to the central server are preferably carried out by an agent operating on the base computer. Co-pending application entitled AGENT SYSTEM FOR A SECURE REMOTE ACCESS SYSTEM filed Jul. 19, 2000, U.S. patent application Ser. No. 09/618,955 by inventors Tu et al., is expressly incorporated herein by reference, describes a preferred agent system and method residing on a base device which provides secure communication between the base device and one or more user server modules. The agent generally comprises software code which is executed within the base device for carrying out the acts suitable for use with the present invention.

The agent system is capable of determining if the base computer is online and communicating this information to a user module in the central server of the secure remote access system, which in turn can verify to the cardholder's financial institution or the merchant that the cardholder's base computer is online. When the base device is online, the agent intermittently contacts the central server system of the remote access system to enable possible remote access of the base computer, as noted above.

When cardholders are signed up for the remote access system, it will be necessary for them to provide information to identify themselves. They will also provide information about the base device that they will want to contact remotely via pager, PDA, or like remote device. Information about the cardholders base device, such as IP address, memory size, hard drive size, and ISP if applicable, is utilized to design a unique code or key that will be stored in the central server data base to recognize the base device of the specific cardholder. Cardholder users of the remote access system will also give a list of remote devices which they plan to use to access the base device. These remote devices are prioritized to determine which remote device should be preferentially used for cardholder verification.

With the above in mind, the transaction authentication system of the invention comprises, in its most general terms, at least one central server system associated with a remote access system and configured for communication with a payment institution, and at least one internet capable device, operatively coupled for communication with the central server system, with the central server system configured to determine authentication of a cardholder electronic transaction, according to data received from the internet capable device upon a request for verification of the cardholder electronic transaction from the payment institution.

By way of example, and not of limitation, the internet capable device will comprise a base computer, associated with the cardholder, which includes an agent configured to periodically communicate with the central server system and receive task requests from the central server system. Preferably, the system also includes a wireless internet capable device, such as a cell phone, which is configured for communication with the central server system.

The transaction verification method of the invention, in a first embodiment, generally comprises requesting authentication of a transaction by a payment institution, transmitting the authentication request to a user's remote device, authenticating or denying the authentication by a user via the remote device, and the corresponding allowance or denial of the transaction.

More specifically, the method generally comprises requesting verification of a cardholder electronic transaction by a payment institution from a central server system, contacting by the central server system at least one internet capable device associated with the cardholder, determining by the central server system if the cardholder electronic transaction is authorized by the cardholder, and communicating authentication information by the central server system to the payment institution. Preferably, the method further comprises verifying, by the central server system, the identity of the payment institution, and allowing the cardholder electronic transaction when the authentication information indicates that the cardholder has authorized the cardholder electronic transaction.

The internet capable device preferably comprises a base computer associated with the card holder, as well as a remote or wireless device such as a cell phone. Determination of authentication may be based on a simple determination that the base computer is online, indicating that the cardholder has initiated the electronic transaction. The determination may alternatively involve a task request from the central server system to the base computer which requires a response from the cardholder through the base computer. Determining authentication for the transaction may additionally, or alternatively, involve a query sent by the central server system to the remote or wireless internet capable device which requires a response from the cardholder through the wireless device which authenticates or authorizes the transaction.

The invention operates upon initiation of an electronic transaction or purchase at the request of a cardholder. The transaction results in a credit request to the cardholder's payment institution to cover payment of the electronic transaction. After the initiation of the electronic transaction, the cardholder's payment institution contacts the central server of a remote access system to query for authentication of the cardholder. The central server system first verifies the credentials of the payment institution. Once the central server has verified the identity of the payment institution, the central server determines if the cardholder's base computer is on the internet according to signals sent by the agent on the base computer. If the base computer is online, the central server may contact the base computer and provide a query requesting verification of the electronic transaction by the cardholder.

If the base device is not online, the central server of the remote access system may contact the cardholder by the cardholder's remote device such as a cellular telephone or two-way pager to verify the purchase. The central server of the remote access device will communicate the verification task or query to the remote device by either sending a text or a voice message (most likely a synthesized voice) to which the cardholder must enter a response. The response is communicated to the central server and transmitted to the payment institution from the central server for authentication of the purchaser to be completed. If there is no verification by the cardholder, the payment institution may decide whether to allow the transaction to continue, or deny authorization, depending on the financial risk involved in the transaction.

Certain electronic transactions may be classified as high risk by the payment institution, and personal intervention by the cardholder will be a minimum requirement for transaction authentication. In these instances, the payment institution may request the central server of the remote access system to contact the cardholder via a remote device to authenticate the transaction. In this case it may not be necessary to query the base device.

When a payment or financial institution initially signs up for the verification service provided by the invention through a remote access system, the payment institution will present authentication documents for future verification of the institution by digital means. The payment institution may also want to classify transactions as, for example, low risk, medium risk and high risk (i.e. level one, level two and level three security levels) which would entail varying degrees of verification or authentication for an electronic transaction.

This invention is important to consumers that carry out electronic internet transactions from devices other than their base device. This allows the payment institution to insure the transaction is not fraudulent and adds a level of security to the cardholders which is not presently available for electronic purchases.

The electronic transaction authentication system and method may alternatively be considered as comprising in combination a remote access system with a central server system in operative communication with the internet, a transaction server for communicating with payment institutions; the transaction server comprising at least one server within the central server system, an internet server for communicating with remote devices, the internet server within the central server system, a task transmitter within the central server system for transmitting tasks to base computers; and a task data receiver within the central server system for receiving task data from base computers.

An object of the present invention is to provide an electronic transaction authentication system which gives a cardholder security from fraudulent internet purchases.

Another object of the invention is to provide an electronic transaction authentication system which allows fully transparent authenticatable purchases by a cardholder.

Another object of the invention is to provide an electronic transaction authentication system which allows verification of an online purchaser by determining if the cardholder's base computer is connected to the internet by an agent residing on the base computer.

Another object of the invention is to provide an electronic transaction authentication system which allows secure communication between a cardholder base device and a user server module or modules of a remote access system.

Another object of the invention is to provide an electronic transaction authentication system which allows verification of the consumer transparently by querying the agent on the base device.

Another object of the invention is to provide an electronic transaction authentication system wherein a cardholder's base machine is utilized as a security key and authentication of the transaction.

Another object of the invention is to provide an electronic transaction authentication system which allows authentication of the purchaser without the purchaser having to input digital certification or answer personal questions.

Another object of the invention is to provide an electronic transaction authentication system which allows personal intervention for security and authentication of electronic transactions.

Another object of the invention is to provide an electronic transaction authentication system wherein verification of the cardholder can be carried out when the cardholder is away from his or her base computer.

Another object of the invention is to provide an electronic transaction authentication system which allows a consumer cardholder to purchase goods and services online away from the base device and personally verify the transaction by a remote device using the secure remote access system.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

FIG. 1 is a schematic diagram of a transaction authentication system in accordance with the present invention.

FIG. 2 is a flowchart showing generally the acts and events associated with a first preferred transaction authentication method in accordance with the invention.

FIG. 3 is a flowchart generally showing the acts and events associated with the transaction authentication method of the present invention in a continuous connection environment.

FIG. 4 is a flowchart generally showing the acts and events associated with the transaction authentication method of the present invention in a non-continuous connection environment.

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in the apparatus shown generally in FIG. 1 and the method outlined generally in FIG. 2 through FIG. 4. It will be appreciated that the apparatus may vary as to configuration and as to details of the parts, and that the method may vary as to details and the order of the steps, without departing from the basic concepts as disclosed herein. The invention is disclosed generally in terms of an electronic transaction authentication apparatus and system, although numerous other uses for the invention will suggest themselves to persons of ordinary skill in the art. The term "cardholder" as used herein means any consumer or purchaser making online or electronic purchases via credit, either through one or more credit cards or other form of credit account. The term "payment institution" as used herein means a credit card company or any like organization which extends credit to cardholders for online purchases. The term "merchant" as used herein means any seller, vendor, auction house or like organization that provides goods or services for sale, on a credit basis, online or over the internet. In some instances the merchant may act as the payment institution by extending credit to the cardholders.

Referring now to FIG. 1, there is shown a transaction authentication system 10 in accordance with the present invention. Generally, the transaction authentication system 10 includes a central server system 12 which is operatively coupled for communication with a base computer 14 and a remote device 16. Central server system 12, base computer 14 and remote device 16 comprise generally a remote access system of the type described in co-pending U.S. patent application Ser. No. 09/618,954 entitled "METHOD AND APPARATUS FOR A SECURE REMOTE ACCESS SYSTEM" and co-pending U.S. patent application Ser. No. 09/618,956 entitled "REMOTE ACCESS COMMUNICATION ARCHITECTURE APPARATUS AND METHOD". Base computer 14 may be in continuous or non-continuous communication with central server system 12.

Central server system 12 is shown as including a transaction server 18 and an account data base 20 as used in carrying out electronic transactions. The central server system 12 may consist of one or more additional servers (not shown) such as, for example, a main web server, a database server, an account creation server, a server associated with a modem pool, a computer user server, a mobile telephone user server, a PDA user server, and an internet appliance user server. A multiple server configuration of this type is disclosed in detail in co-pending U.S. patent application Ser. No. 09/618,954 entitled "METHOD AND APPARATUS FOR A SECURE REMOTE ACCESS SYSTEM and the details are omitted here to avoid overcomplication of the present disclosure. Such a multiple server configuration would allow for the handling of certain discreet operations by different servers and is preferred in some embodiments of the invention.

The transaction server 18, as well as other servers associated with central server system 12, may comprise any standard data processing means, including minicomputer, microcomputer, UNIX®, mainframe, personal computer (PC) or clone thereof, an APPLE® computer or clone thereof, a SUN® work station or server, or other appropriate computer. As such, transaction server 18 includes conventional hardware components (not shown) such as a motherboard, central processing unit (CPU), random access memory (RAM), hard disk drive, display adapter, other storage media, a monitor, keyboard, mouse or other user input/output means, a network interface card (NIC), and/or other conventional input/output devices.

Transaction server 18 generally has loaded in its RAM conventional operating system software (not shown), such as UNIX®, Linux™, Windows NT®, Novell®, Solaris® or other server operating system. Transaction server 18 may further have loaded in its RAM conventional web server software (not shown) for handling http (hyper text transfer protocol) or web page requests from remote users. Transaction server 18 or a related data base server (not shown) in central server system 12 will also generally have loaded in its RAM conventional database software (not shown) such as Oracle®, IBM® DB2, Microsoft SQL® or other appropriate database software for storage, update and retrieval of system user data associated with database 20.

Central server system 12 is operatively coupled for communication with one or more payment institutions 22 via the internet 24. The payment institution 22 will generally include one or more of its own servers (not shown) together with a credit database (also not shown) regarding the customers or users of payment institution 22. The payment institution 22 is operatively coupled for communication with one or more merchants 26 via the internet 24. Merchant 26 in turn is operatively coupled for communication over the internet with base computer 14, either directly through a continuous communication arrangement, or via telephone line through an internet service provider 28.

Base computer 14 preferably comprises a conventional minicomputer, microcomputer or like data processing means of the type described above, or local network thereof, which is configured for home or office use, and which would typically be used by a cardholder for carrying out an electronic purchase. Base computer 14 preferably is configured to run according to a conventional operating system (not shown) such as Windows 98 or the like as described above, and base computer 14 will generally include a conventional browser program (not shown) such as NETSCAPE NAVIGATOR® or MICROSOFT EXPLORER® to allow base computer 14 access to central server system 12 via the internet 24.

Base device 14 will also include an agent system 30, preferably in the form of software stored in its RAM, which periodically tasks or queries the central server system 12 as described further below. The agent 30 is configured to periodically contact the central server 12, when online, to determine if any tasks need to be carried out by the base device 14 according to instruction from the central server system 12. Co-pending application entitled AGENT SYSTEM FOR A SECURE REMOTE ACCESS SYSTEM, filed Jul. 19, 2000, identified as U.S. patent application Ser. No. 09/618,955, describes more fully this method, system, and apparatus of implementing the agent and is expressly incorporated herein by reference.

Remote device 16 may comprise, for example, conventional computers (including desktop, portable notebooks, and palmtop computers), mobile telephone devices (such as cellular and PCS (personal communications service) phones), personal digital assistants (PDAs, such as Palm Pilot™ or Windows CE™), and other Internet appliance devices (such as WebTV™). In general, any remote access device 16 which may communicate over the Internet is suitable for use with the present invention.

The system 10 is in essence a remote access system which enables payment institutions 22, via the internet 24, to query the central server system 12 to retrieve data from the a base computer 14 and additionally query remote device 16 of a cardholder for purchase authentication. No special software is installed on the remote device 16. To the contrary, remote device 16 may be any device capable of being contacted and capable of receiving verbal queries such as a mobile telephone or having a readable interface such as a pager or any other such device. Preferably the device 16 will include means for responding to an inquiry as well.

The account database 20 will generally include identification information for a plurality of cardholder users who are registered with or otherwise participating in the transaction authentication system of the invention. In this regard, each cardholder will have provided identification information associated with the cardholder's base computer 14, as described further below. The account database 20 will also include identifying information regarding payment institution 22, which will also have previously registered with the transaction authentication system 10. Account database 20 may comprise separate or multiple databases for cardholder and payment institution users, but is shown as a single database 20 for reason of clarity.

In operation, a payment institution 22 will receive a credit request from a merchant 26 for an electronic purchase identified with a cardholder customer of the payment institution 22. The payment institution 22 will then establish a connection to the central server system 12 by connecting to transaction server 18 via the internet 24 in a conventional manner. Once thus connected and authenticated, the payment institution 22 will request the central server system 12 to authenticate a specific cardholder name and credit number being used for an internet purchase from the merchant 26. The central server system 12 will obtain the identification or ID of the cardholder's base device 14 by searching the central server account data base 20 for the requested cardholder information.

The base computer 14, via the agent 30 installed thereon, will contact the central server 12 from time to time when online to determine if any tasks need to be carried out by the base device 14, as noted above. Thus, the base computer 14 intermittently contacts the central server system 12 to determine whether the central server system 12 needs to have tasks performed, such as transaction verification.

When a transaction authentication task is received from a payment institution 22 by the central server system 12, the central server system 12 "listens" for the intermittent contact from the agent 30 on base computer 14. If there is contact with the agent, the central server system has confirmation that the base computer 14 of the cardholder is online. For many electronic transactions involving low financial risk, this simple verification that the cardholder's base computer 14 is online is sufficient authentication for the transaction, since the fact that the cardholder's base computer is online indicates that the cardholder is initiating the transaction from the base computer 14, and that the transaction is most likely not a fraudulent transaction being carried out by a different user at a different location.

If the payment institution 22 has requested further verification of the cardholder due to greater financial risk involved in the transaction, the central server system 12 replies to the intermittent query from the agent 30 by providing an internet protocol (IP) address and port number for the base computer 14 to establish a socket connection with the central server system 12. The IP address and port number correspond to a server in the central server system 12 handling the particular transaction task requests. Thus, for further verification regarding the identity of the cardholder, the central server 12 can send a message to the base computer 14 such as a text message "instant messenger application" asking the user of the base computer 14 a question such as "do you want to complete the transaction for X dollars on your Visa card?". Alternatively, the central server 12 may query the user of the base computer 14 for his or her remote access system PIN number. This PIN number will be available to the cardholders and will likely have been memorized from routine use of the service. The above are only examples of the possible queries the central server system 12 may send to the base computer 14 for authentication of the cardholder, and are not to be considered limiting. The base computer 14 will transmit the response back to the central server system 12, which will send the verification data to the payment institution 22, which will in turn decide to either complete the transaction, obtain further verification from the cardholder, or deny the transaction.

It should be noted that, because of the intermittent initial contacts from the base computer 14 to the central server system 12 when online, operation of the system invention will be allowed even in the presence of a firewall. That is, a firewall between the base computer 14 and the internet 24 is intended to preclude a signal from an outside source coming through the firewall unless requested, but will allow outgoing signals; thus, a message sent from a base computer 14 to a web server would be allowed through a firewall along with any reply to that message. Likewise, since the base computer 14 establishes the continuous connection with the IP address and port number of the server in question after being informed of the same from the central server system 12 in response to one of the intermittent contacts, a firewall does not interfere with operation of the invention.

The payment institution 22 may, in some instances, request the central server system 12 to contact the cardholder via a remote device 16 to authenticate the transaction by further personal intervention from the cardholder. In such instances, the central server 14 will obtain the contact number of the remote device 16 from the account data base 20 of the central server 12 and contact the remote device 16 for authentication of the transaction. The query sent to the remote device 16 maybe in the form of a text message or a verbal message synthetically produced. Queries similar to those examples stated above may be sent to the remote device 16 for personal intervention for authentication of the cardholder. The response received from the remote device 16 to the query will be transmitted to the central server 12 and the central server 12 will transmit the data to the financial institution 22.

In some preferred embodiments of the invention, the payment institution 22 may designate different levels of authentication scrutiny for different levels of financial risk. For example, an electronic transaction involving fifty dollars or less may involve a small enough risk to a payment institution 22 that a mere verification that the cardholder's base machine 14 is online is sufficient authentication for a transaction to be allowed. This situation provides a fully transparent purchase, allowing the cardholder to carry out an internet transaction by credit without the cardholder personally having to perform any acts associated with verification of identity.

In cases where the transaction amount is greater than fifty dollars but less than two hundred, for example, an additional level of verification may be required by sending a text message query to the base machine 14 which requires the user of the base machine 14 to reply to the query. For a still greater level of security, in transactions involving more than two hundred dollars, for example, verification from a remote device 16, such as a cell phone also may be required. This will generally present the highest level of security, as the cardholder presumably will be the only person having control of the remote device 16. Once again, it should be understood by those skilled in the art that the above examples are merely exemplary, and the classification of financial risk for various transactions will vary for different payment institutions 22 and cardholders.

There may exist situations where a cardholder desires to initiate a relatively low risk electronic transaction from a computer other than the base computer 14. In these cases, verification that the cardholder's base machine 14 is online will not be effective, because the base machine 14 will not be online (because the cardholder is elsewhere). In all cases where the central server system 12 determines that the base machine 14 is not online, a further verification via remote device 16 will generally have to be carried out.

The method and operation of the invention will be more fully understood with reference to the flow charts of FIG. 2 through FIG. 4, as well as FIG. 1. The order of actions or events as shown in FIG. 2 through FIG. 4 and described below is only exemplary, and should not be considered limiting. The operation of the invention in cases where base computer 14 is continuously connected to the internet, via T1, DSL, ISDN, cable, or other continuous connection, is shown in FIG. 1. FIG. 3 illustrates the operation of the invention in the case of non-continuous internet connection for base computer 14 such as a connection via a modem.

Referring now to FIG. 2, as well as FIG. 1, there is illustrated a preferred embodiment of a transaction verification method in accordance with the invention. At event 100, a request for authentication is made by a payment institution 22 to the central server system 12. This event is generally initiated by an online transaction that results in a credit request to the payment institution for a purchase by a user.

At event 110, an authentication request is transmitted by central server system 12 to the user's remote internet capable device 16. In the preferred embodiments, the remote device will comprise a cellular telephone or like device which utilizes "short message service" or SMS™ and is capable of receiving and displaying short text messages on a liquid crystal display or other simple display. Thus, event 110 will generally involve transmission of a query in the form of a short text message to the user's remote device such as "verify transaction (y or n)?" or "accept charge?" or a like simple text message which invites a response by the user. The user may respond by entering a "yes" or "no" using the alphanumeric keypad on the remote device. The authentication request may be more complex where higher financial risk is involved, and may involve, for example, a simple text message which requests the user to enter a pin number or password via the alphanumeric keypad.

At event 120, an authentication decision is made by the central server 12 according to the response made by the user of the remote device 16. If the user has indicated assent to the transaction by entering "yes" or a requested PIN or password, event 130 is carried out. If the user denies the transaction by entering "no", or if no response is made by the user, event 140 is carried out. The submission by a user of an incorrect PIN or password may result in event 140, or alternatively may result in the repetition of events 110 and 120 with an additional text message to the user indicating that the previously entered PIN or password was incorrect and inviting the user to enter the correct number or password.

At event 130, upon receiving authentication in event 120, central server system 12 notifies the payment institution 22 that authentication or verification of the transaction has been received, and the payment institution allows the transaction to proceed by providing credit for the transaction.

At event 140, after the user has denied authentication of a transaction or has not responded in event 120, the central server system 12 notifies the payment institution that authentication of the transaction was not provided, and the payment institution denies the transaction.

In a variation of the above example, for cases of high financial risk, the simple text message transmitted in event 110 may request the user to physically telephone the payment institution or personnel associated with the central server system 12 to personally verify the transaction.

Referring now to FIG. 3, as well as FIG. 1, the acts associated with a base computer 14 with a continuous connection to the internet in accordance with the present invention are generally shown. At event 200, the agent 30 on base computer 14 periodically contacts the central server system 12 to inquire whether a task is required by the central server system 12.

At event 210, a decision is made by the agent as to whether a task is required. If a task is required, as determined by a task request transmitted by the central server system 12, event 220 is carried out in the manner described below. If no task request has been submitted by central server system 12, event 200 is repeated.

At event 230, and generally concurrently with events 200 and 210 described above, a payment institution 22 submits an authentication request to the central server system 12. Event 230 is generally initiated in response to a request from a merchant 26 to payment institution 22 for verification of a cardholder identity in association with an electronic purchase by the cardholder, as described above. The verification request by the merchant 26 in turn leads to the authentication request of event 230.

Following event 230, verification of the payment institution 22 identity is carried out in event 240. In event 240, SSL (Secure Sockets Layer) is enabled for security, and central server system 12 searches its database 20 for identity information related to payment institution 22. Following verification of the payment institution 22, event 250 is carried out. In the event that verification of the payment institution cannot be carried out, event 230 may be repeated.

At event 250, central server system 12 transmits a task request to agent 30 on base computer 14 requesting authentication of the cardholder, in accordance with the verification request from the payment institution 22 in event 230. As noted above, agent 30 periodically "listens" for such task requests in event 200, and event 220 is carried out in the event of a task request from central server system 12, as occurs in event 250.

At event 220, the task request for cardholder authentication from central server system 12 is received by base computer 14, and a response to the task request is made to the central server system 12 by the base computer 14. The nature of the response by base computer 14 to the task request carried out in event 220 will generally vary according to the type of authentication required by the payment institution 22, which is determined by the level of security desired for the cardholder's electronic transaction, as described above. In a typical situation, performance of the requested task in event 220 will involve presenting a text query to the user of base computer 14 requesting verification of the cardholder electronic transaction, to which the cardholder will respond by answering "yes", typed on the keyboard, to verify the transaction, or, at a higher level, will respond by entering a PIN number or password. The cardholder response (if any) is sent or returned as data to the central server system 12, which then carries out event 260.

At event 260, the central server system 12 makes an authentication determination according to the data received from base computer 14 in event 220. If the data received from base computer 14 indicates that the cardholder has verified the transaction, authentication is recognized by the central server system and event 270 is carried out. If the data provided by the base computer 14 indicates that the cardholder has denied the transaction, or if the provided data indicates that no response was made by the cardholder to the authentication request or if the response was inappropriate, then event 280 is carried out.

At event 270, which follows authentication in event 260 above, the central server system 12 communicates an authentication of the electronic transaction to the payment institution 22, which then allows the transaction by providing the requested credit.

At event 280, which results if authentication does not occur in event 260, central server system 12 contacts a cardholder remote device 16 for authentication.

At event 290, the cardholder remote device 16, which will typically be a cell phone, receives the authentication request and sends responsive data regarding the authentication request back to the central server system 12. Generally, the cell phone will present a query to the cardholder in the form of a displayed text message or synthetic voice which requests authorization or verification for the electronic transaction. Depending on the nature of the transaction and level of security required by the payment institution 22, this authorization may be in the form of a simple affirmative response typed onto the alphanumeric keypad of the remote device 16, or for higher security, may require entering the cardholder's PIN or password, as described above.

At event 300, the central server system 12 makes an authentication determination based on the response from remote device 16 in event 290. If the data received from remote device 16 in event 290 indicates that the cardholder has authorized the transaction or entered the appropriate PIN, authentication occurs, and event 310 is carried out. If the data from remote device 16 indicates that the transaction has been denied by the cardholders or that no reply by the cardholder was made, or that the response from cardholder was inappropriate, no authentication occurs, and event 320 is carried out.

At event 310, which follows authentication in event 300 above, the central server system 12 communicates an authentication of the electronic transaction to the payment institution 22, which then allows the transaction by providing the requested credit.

At event 320, which results if authentication does not occur in event 300, central server system 12 informs the payment institution 22 that the cardholder has either expressly not authorized the transaction, or has not responded to the request sent to remote device 16 or responded improperly, and the payment institution may then deny the transaction.

Referring now to FIG. 3, as well as FIG. 1, the acts associated with a non-continuous connection between base computer 14 and the internet are generally shown. At event 400 a payment institution 22 submits an authentication request to the central server system 12. Event 400 is generally initiated by a request from a merchant 26 to payment institution 22 for verification of a cardholder identity in association with an electronic purchase or transaction by the cardholder, as noted above.

At event 410, verification of the payment institution 22 identity is carried out. Generally, SSL (Secure Sockets Layer) is enabled for security, and central server system 12 searches its database 20 for identity information related to payment institution 22. Following verification of the payment institution 22, event 420 is carried out. In the event that verification of the payment institution cannot be carried out, event 400 may be repeated.

At event 420, central server system 12 transmits a task request to agent 30 on base computer 14 requesting authentication or authorization by cardholder for the electronic transaction, in accordance with the verification request from the payment institution 22 in event 400.

At event 430, the central server system determines whether or not the base computer is online by determining if the agent 30 is available or can be contacted, by sending a task request to the base computer 14. If the agent 30 is available, indicating that base device 14 is online, event 440 is carried out. If agent 30 is not available because base computer 14 is off-line, event 450 occurs.

At event 440, after the central server system 12 has determined that the base computer 14, is online, a task request for cardholder authentication from central server system 12 is received by base computer 14, and a response to the task request is made to the central server system 12 by the base computer 14. The nature of the response by base computer 14 to the task request carried out in event 440 will generally vary, as related above, according to the type of authentication required by the payment institution 22, which is determined according to the level of financial risk associated with the cardholder's electronic transaction. Thus, performance of the requested task in event 440 may involve presenting a text query to the user of base computer 14 requesting verification of the cardholder electronic transaction, to which the cardholder will respond by answering "yes", typed on the keyboard, to verify the transaction. At a higher level of security, the user may respond by entering a PIN number or password in the manner described above. The cardholder response (if any) is sent or returned as data to the central server system 12 as authentication data or information, which is used for an authentication determination in event 460.

At event 460, the central server system 12 makes an authentication determination according to the authentication data or information received from base computer 14 in event 440. If the information or data received from base computer 14 indicates that the cardholder has verified the transaction, authentication is recognized by the central server system and event 470 is carried out. If the data provided by the base computer 14 indicates that the cardholder has denied the transaction, or if the provided data indicates that no response was made by the cardholder to the authentication request or that the response was improper, then event 450 is carried out.

As described above, some electronic transactions may be verified by a simple determination that agent 30 is available and base computer 14 is online, and authentication of an electronic transaction by central server system 12 can be made by a determination of whether or not agent 30 is available. In such situations, event 440 may be omitted, and authentication in event 460 will be carried out based on whether or not base computer 14 is online.

At event 470, which follows authentication in event 460 above, the central server system 12 communicates an authentication of the electronic transaction to the payment institution 22, which then allows the transaction by providing the requested credit.

If authentication does not occur in event 460, or if it is determined that agent 30 is not available in step 430, then event 450 is carried out. At event 450, central server system 12 contacts a cardholder wireless or remote device 16 for authentication.

At event 480, the cardholder remote device 16, which will typically be a cell phone, receives the authentication request from central server system 12, and sends responsive authentication data back to the central server system 12. Generally, the remote device, preferably a cell phone, will present a query to the cardholder in the form of a displayed text message or synthetic voice which requests authorization or verification for the electronic transaction, as described above. Depending on the nature of the transaction and level of security required by the payment institution 22, this authorization may be in the form of a simple affirmative response typed onto the alphanumeric keypad of the remote device 16, or for higher security, may require entering the cardholder's PIN or password, as described above.

At event 490, the central server system 12 makes an authentication determination based on the authentication data from remote device 16 in event 380. If the data received from remote device 16 in event 480 indicates that the cardholder has authorized the transaction, authentication occurs, and event 500 is carried out. If the data from remote device 16 indicates that the transaction has been denied by the cardholder, or that no reply by the cardholder was made or cardholder's reply was improper, no authentication occurs, and event 410 is carried out.

At event 500, which follows authentication in event 490 above, the central server system 12 communicates an authentication of the electronic transaction to the payment institution 22, which then allows the transaction by providing the requested credit.

At event 510, which results if authentication does not occur in event 490, central server system 12 informs the payment institution 22 that the cardholder has either expressly not authorized the transaction, or has not responded properly to the request sent to remote device 16, and the payment institution may then deny the transaction.

It should be understood that, in some cases, the payment institution 22 could recognize a high enough level of security that authentication is initially sought via the cardholder remote device 16, without contacting base computer 14. In such situations, events 420, 430, 440 and 460 will generally be skipped, and event 450 is carried out following verification of the payment institution in event 420. In other respects, the invention will operate in the same manner.

Accordingly, it will be seen that this invention provides a transaction security and authentication apparatus and system for electronic commerce which provides authentication of internet purchases by communication with a cardholder's base computer, or by contacting the cardholder by remote device for purchase verification. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for transaction verification, comprising:
    (a) receiving a request at a central server system, from a payment institution separate from the central server system, for verification of a cardholder electronic transaction, the payment institution receiving a request from a merchant separate from the payment institution;
    (b) automatically initiating contact by a first internet capable device associated with said cardholder with the central server system;
    (c) determining, by said central server system based on said contact, if said cardholder electronic transaction is authorized by said cardholder; and
    (d) communicating authentication information, by said central server system, to said payment institution.

2. The method of claim 1, further comprising verifying, by said central server, the identity of said payment institution.

3. The method of claim 1, further comprising allowing said cardholder electronic transaction when said authentication information indicates that said cardholder has authorized said cardholder electronic transaction.

4. The method of claim 1, wherein said internet capable device is a base computer associated with said cardholder.

5. The method of claim 4, wherein said determining is carried out by determining if said base computer is online.

6. The method of claim 4, wherein said determining comprises sending a task request from said central server system to said base computer, said task request requiring a response from said cardholder through said base computer.

7. The method of claim 1, further comprising the step of contacting, by said central server system, a wireless remote device associated with said cardholder.

8. The method of claim 7, wherein said determining comprises sending a query, by said central server system to said wireless device, said query requiring a response by said cardholder through said remote device authenticating said cardholder electronic transaction.

9. A transaction authentication system, comprising:
    (a) at least one central server system associated with a remote access system, said central server system configured for communication with a payment institution for providing credit based on a request from a merchant that is separate from the payment institution; and
    (b) at least one cardholder base computer operatively coupled for communication with said central server system, said base computer including an agent configured to intermittently initiate contact with said central server system when said base computer is online; and
    (c) said central server system configured to determine authentication of a cardholder electronic transaction, according to data received from said base computer, upon a request for verification of said cardholder electronic transaction from said payment institution.

10. The system of claim 9, further comprising at least one cardholder remote device configured to communicate with said central server system, said central server system configured to contact said cardholder remote device and request cardholder authorization for said cardholder electronic transaction, when said central server system cannot determine said authentication from said data received from said base computer.

11. A method for transaction verification, comprising:
    (a) requesting authentication of a cardholder electronic transaction from a merchant, via a payment institution separate from the merchant;
    (b) receiving intermittent contact initiated by an internet capable device;
    (c) transmitting an authentication request to the internet capable device associated with said cardholder via a network in response to receipt of the intermittent contact from the internet capable device in said step (b);
    (d) transmitting a second authentication request to a wireless remote device associated with said cardholder via a network;
    (e) authenticating said cardholder electronic transaction based on said steps (c) and (d) of transmitting an authentication request to the internet capable device and wireless remote device associated with said cardholder; and
    (f) allowing said cardholder electronic transaction by said payment institution.

12. The method of claim 11, wherein said step (c) of transmitting said authentication request is carried out by a central server system in response to said requesting.

13. The method of claim 12, further comprising communicating an authentication message from said internet capable device to said central server system.

14. The method of claim 13, wherein said authenticating is carried out by said central server system according to said authentication message.

15. The method of claim 12, further comprising communicating authentication information, by said central server system, to said payment institution.

16. A method for transaction verification, comprising:
(a) receiving a request at a central server system from a payment institution for verification of a cardholder electronic transaction;
(b) receiving an automatic intermittent contact initiated by an internet capable device querying as to the existence of an electronic transaction at the central server system to be verified;
(c) determining, by said central server system based on said intermittent contact, if said cardholder electronic transaction is authorized by said cardholder; and
(d) communicating authentication information, by said central server system, to said payment institution.

17. The method of claim 16, further comprising verifying, by said central server, the identity of said payment institution.

18. The method of claim 16, further comprising allowing said cardholder electronic transaction when said authentication information indicates that said cardholder has authorized said cardholder electronic transaction.

19. The method of claim 16, wherein said internet capable device is a base computer associated with said cardholder.

20. The method of claim 19, wherein said step (b) of receiving an intermittent contact comprises sending a task request from said central server system to said base computer, said task request requiring a response from said cardholder through said base computer.

* * * * *